United States Patent
Rose et al.

(10) Patent No.: US 9,805,254 B2
(45) Date of Patent: Oct. 31, 2017

(54) PREVENTING DISPLAY CLEARING

(71) Applicant: LENOVO (Singapore) PTE, LTD., New Tech Park (SG)

(72) Inventors: Amy Leigh Rose, Chapel Hill, NC (US); Guillermo Regulez, Wake Forest, NC (US); Justin Michael Ringuette, Morrisville, NC (US); Nathan J. Peterson, Durham, NC (US); Jennifer Lee-Baron, Morrisville, NC (US); John Scott Crowe, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 96 days.

(21) Appl. No.: 14/182,961

(22) Filed: Feb. 18, 2014

(65) Prior Publication Data

US 2015/0235075 A1    Aug. 20, 2015

(51) Int. Cl.
  *G06K 9/00*  (2006.01)
  *G06F 1/32*  (2006.01)

(52) U.S. Cl.
  CPC ....... *G06K 9/00335* (2013.01); *G06F 1/3215* (2013.01); *G06F 1/3231* (2013.01); *G06F 1/3265* (2013.01); *G06K 9/00288* (2013.01); *G06K 9/00617* (2013.01); *Y02B 60/1242* (2013.01); *Y02B 60/1289* (2013.01)

(58) Field of Classification Search
  CPC ........... G06K 9/00335; G06K 9/00617; G06K 9/00288; G06F 1/3215; G06F 1/3265; G06F 1/3231; Y02B 60/1289; Y02B 60/1242
  See application file for complete search history.

(56) References Cited

U.S. PATENT DOCUMENTS

| | | | |
|---|---|---|---|
| 2007/0273714 A1* | 11/2007 | Hodge | G09G 3/20 345/690 |
| 2008/0215443 A1* | 9/2008 | Dooley | G06Q 30/02 705/14.38 |
| 2009/0082066 A1* | 3/2009 | Katz | G06F 1/3203 455/566 |
| 2010/0153764 A1* | 6/2010 | Pratt | G06F 1/3203 713/324 |
| 2011/0267026 A1* | 11/2011 | Locker | G06F 1/3203 323/318 |
| 2011/0279397 A1* | 11/2011 | Rimon | G06F 3/044 345/173 |
| 2011/0291934 A1* | 12/2011 | Yang | G06F 3/0414 345/168 |
| 2013/0201107 A1* | 8/2013 | Rossi | G06F 3/04883 345/163 |

(Continued)

FOREIGN PATENT DOCUMENTS

| CN | 101484928 A | 7/2009 |
|---|---|---|
| CN | 101632057 A | 1/2010 |

(Continued)

*Primary Examiner* — Vijay Shankar
*Assistant Examiner* — Abhishek Sarma
(74) *Attorney, Agent, or Firm* — Kunzler Law Group (57) ABSTRACT

For preventing clearing of a display, a method is disclosed that includes receiving input from a non-tactile sensor, determining user activity based on the input from the sensor, and preventing a display from clearing in response to determining the user activity.

20 Claims, 6 Drawing Sheets

(56) References Cited

U.S. PATENT DOCUMENTS

2014/0062896 A1* 3/2014 Vieta ................. H04M 1/72519
　　　　　　　　　　　　　　　　　　　　　345/173
2014/0225836 A1* 8/2014 Avison-Fell ............ G06F 3/017
　　　　　　　　　　　　　　　　　　　　　345/173

FOREIGN PATENT DOCUMENTS

| CN | 103442196 A | 12/2013 |
| CN | 103576876 A | 2/2014 |

* cited by examiner

PREVENTING DISPLAY CLEARING

FIELD

The subject matter disclosed herein relates to mobile computing devices and more particularly relates to preventing clearing of a display for a mobile computing device.

BACKGROUND

Description of the Related Art

Electrical energy required to operate mobile electronic devices are typically stored in various energy storage devices, such as batteries. Using a battery to power a mobile device limits the amount of energy available to the mobile device.

Displays for mobile electronic devices are typically a primary energy draw. In order increase operating time and preserve battery life, mobile devices typically include screen timeouts. In some examples, when a touch screen is used for the mobile device a timer is reset. When the timer expires, the mobile computing device may clear the display. This may result in unwanted display clearing. For example, a user may be using an application on the mobile computing device and may be waiting for some content to be displayed. Clearing a screen in this scenario may not be desired by the user.

The user may disable the display disable timer, however this may result in significantly reduced battery life, because the display may display longer than necessary. Furthermore, the user may forget to re-enable the time which may result in the display remaining on until the amount of available power expires.

BRIEF SUMMARY

An apparatus for preventing clearing of a display for a mobile computing device is disclosed. In one embodiment, the apparatus may include a processor, a display, an activity module that determines user activity at the apparatus based on input from a non-tactile sensor, and a display module that prevents clearing of the display in response to the user activity module determining user activity. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
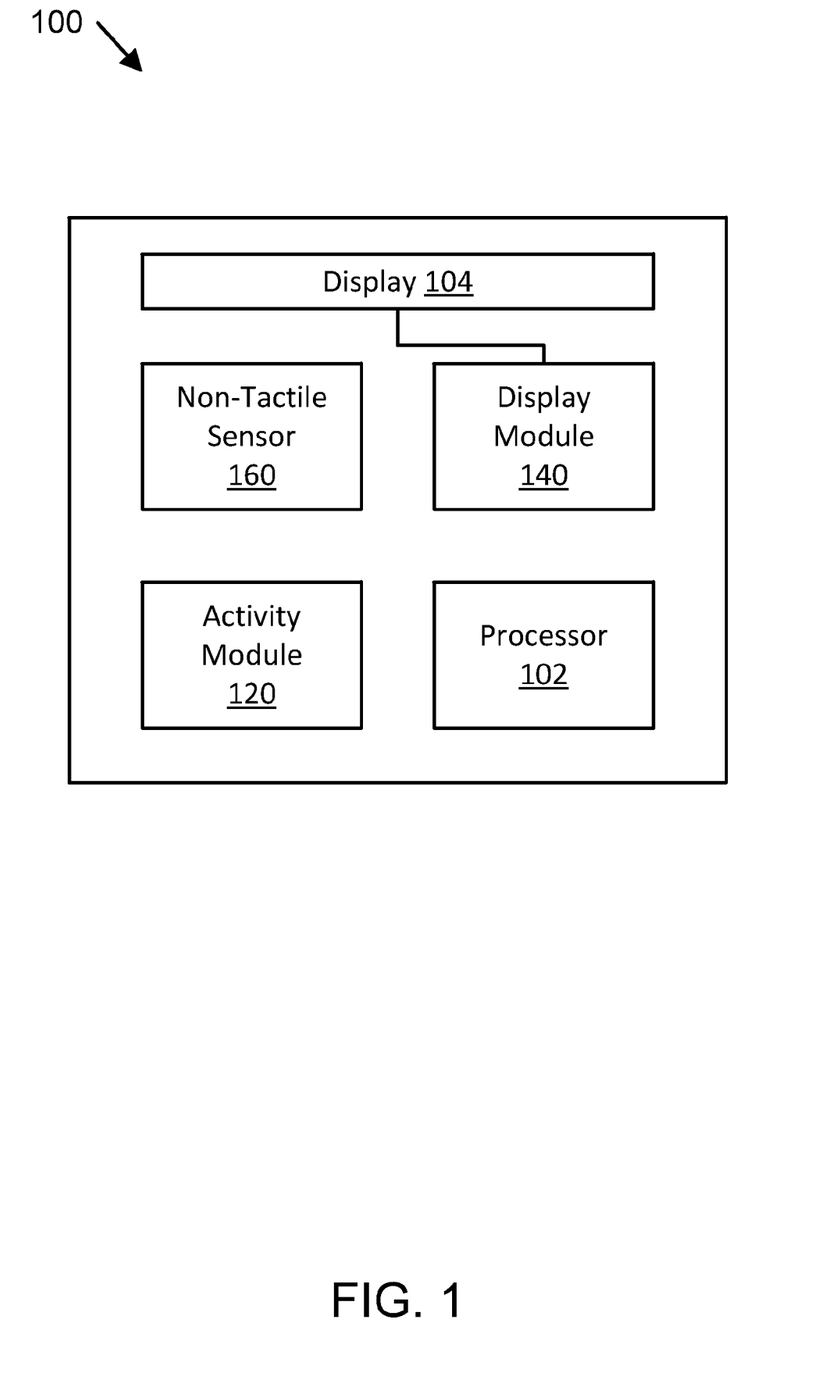
FIG. 1 is a schematic block diagram illustrating one embodiment of an apparatus for preventing display clearing.

FIG. 1 is a schematic block diagram illustrating one embodiment of an apparatus 100 for preventing display clearing. In one embodiment, the apparatus 100 may include a processor 102, a display 104, a display module 140, and an activity module 120.

In one embodiment, the processor 102 may include any kind of microprocessor as one skilled in the art may appreciate. The processor 102 may be capable of executing executable code as described herein.

In another embodiment, the apparatus 100 may include a display 104. A display 104 may include any available display type, technology, architecture, or the like. In certain examples, a display 104 may include an electronic display, a flat panel display, a liquid crystal display, an electro-mechanical display, a volumetric display, or other, or the like. A display 104 may include a cathode ray tube, a light emitting diode, an electroluminescent display, electronic paper, plasma display panel, liquid crystal display, organic light-emitting diode, surface-conduction electron-emitter display, laser TV, carbon nanotubes, quantum dot display, interferometric modulator display, or other, or the like.

In one embodiment, the activity module 120 may determine use of the apparatus 100 based on input from a non-tactile sensor 160. A non-tactile sensor 160, as described herein, may include any module or device capable of measuring a physical property save tactile sensors. Many examples of various non-tactile sensors are described in this application, and this disclosure is meant to include all such non-tactile sensors, and other non-tactile sensors as one skilled in the art may appreciate. In another embodiment, the non-tactile sensor 160 may generate a value that represents the physical property and transmit the value via a signal that may be transmitted to the activity module 120. In another embodiment, the non-tactile sensor 160 may include various modules that will be described.

Figure 2:
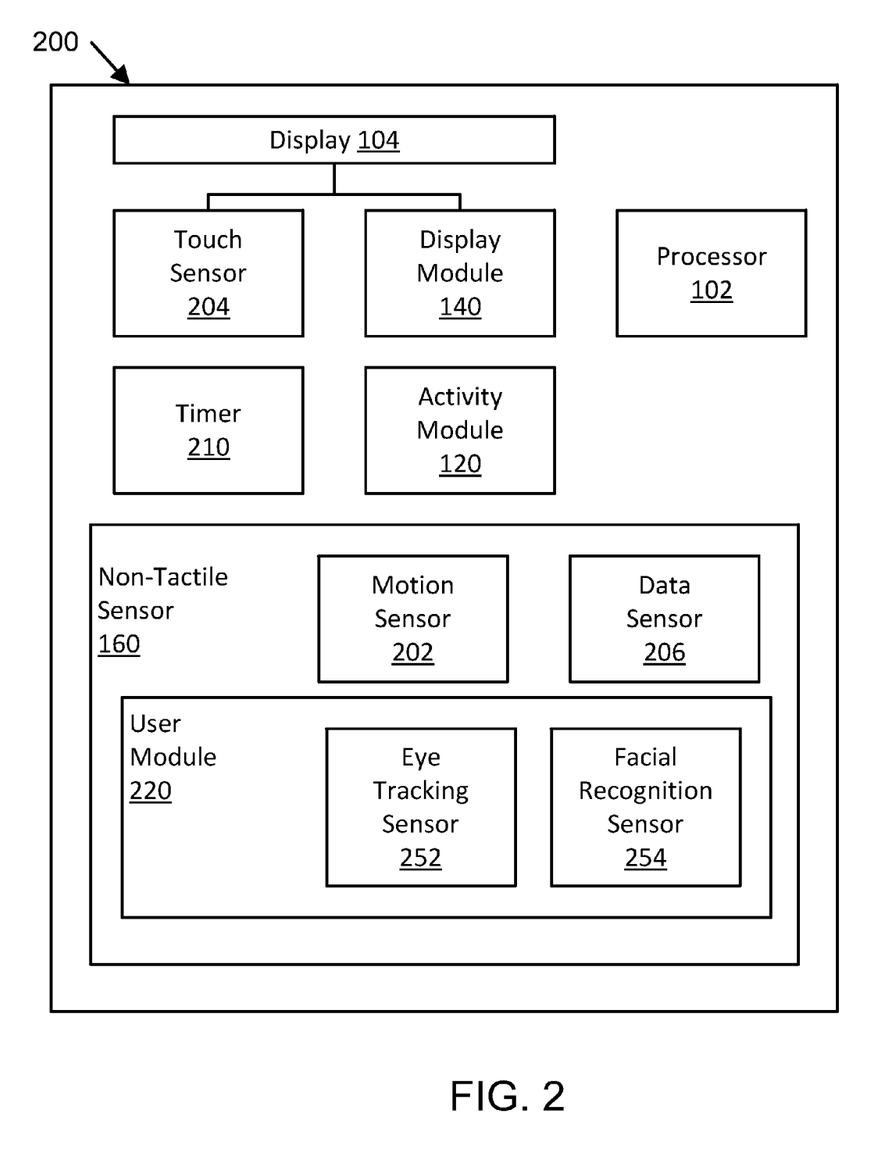
FIG. 2 is a schematic block diagram illustrating one embodiment of an apparatus for preventing display clearing.

In certain embodiments, the activity module 120 may determine that a user is using the apparatus 100 based on input from a non-tactile sensor 160 as described herein. In another embodiment, the activity module 120 may determine use of the apparatus 100 based on input from more than one non-tactile sensor 160 or a combination of a non-tactile sensor 160 and a touch sensor 204 (FIG. 2).

In one example, motion of the apparatus 100 may be based on a user using the apparatus 100. In another example, touches at a touchscreen of the apparatus 100 may indicate use of the apparatus 100. In another example, recognizing a user may indicate that the user may be using the apparatus although there may be no detected motion. In another example, data being transferred to or from the apparatus 100 may indicate that a user may be using the apparatus 100.

In one embodiment, the display module 140 may prevent clearing of the display 104 in response to the activity module 120 determining that the apparatus 100 is being used. In one example, the activity module 120 may determine that the apparatus 100 is being used based on motion of the apparatus, and the display module 140 may not allow clearing or blanking of the display 104 in response to the determination.

In one embodiment, clearing a display may include the display entering a low power state. In another embodiment, clearing a display may include reducing a brightness for the display such that the display may consume less power. In another embodiment, clearing a display may include displaying a substantially similar color on the display so that a user may no longer discern displayed components. In another embodiment, clearing a display may include any combination of the aforementioned clearing techniques. Of course, one skilled in the art may appreciate other ways a display may be cleared and this disclosure is meant to include all such ways.

Clearing of a display may be initiated by executable code operating the apparatus 100. Therefore, in certain embodiments, preventing clearing of a display may include notifying the apparatus 100 that a user is using the apparatus 100. This may cause the apparatus 100 to not clear the display.

In another embodiment, preventing clearing of a display may include simulating user activity. For example, a computing device may be configured to clear in response to no touches being detected at a touch screen for the computing device. Therefore, in one embodiment, preventing clearing of a display may include simulating a touch at a touch screen of the computing device. This may cause the computing device to not clear the display although a user may not be touching the touch screen.

In another embodiment, a system may include a processor 102, a display 104 operatively coupled to the processor 102, a non-tactile sensor 160 that senses user activity at the system, the activity module 120, and the display module 140. In one example, the sensor may be a data sensor 206 (FIG. 2) and the activity module 120 may determine that the apparatus 100 is being used based on data being transferred to or from the apparatus 100. In another example, the sensor may be a data sensor 206 (FIG. 2) and the activity module 120 may determine that the apparatus 100 is being used based on the user executing commands to an application on the apparatus 100. For example, a user may have requested a web page and the apparatus may be transferring data for the web page. In this example, the display module 140 may prevent clearing of the display 104 while the web page is loading. Further examples or determining use of the apparatus 100 are included in subsequent paragraphs.

FIG. 2 is a schematic block diagram illustrating one embodiment 200 of an apparatus for preventing display clearing. In one embodiment, the apparatus 200 may include a processor 102, a display 104, the activity module 120, the display module 140, and a touch sensor 204. The non-tactile sensor 160 may include a motion sensor 202, a data sensor 206, a timer 210 and a user module 220. The user module 220 may include an eye tracking sensor 252 and a facial recognition sensor 254. The processor 102, the display 104, the activity module 120, and the display module 140 may or may not be substantially similar to those depicted in FIG. 1.

In one embodiment, the activity module 120 may determine use of the apparatus 100 based on input from the non-tactile sensor 160 as well as a touch sensor 204. In one embodiment, motion sensor 202 may be selected from the group consisting of an accelerometer and a camera. An accelerometer as described herein may include a device that measures acceleration as one skilled in the art may appreciate. Measured acceleration may or may not be coordinate acceleration. Therefore, an accelerometer as described herein may measure acceleration with or without considering the effects of gravity, or other forces. In another embodiment, the motion sensor 202 may determine motion by sensing a change in velocity for the apparatus 200. The change in velocity may be in any frame of reference as one skilled in the art may appreciate.

In one example, the motion sensor 202 may detect that the apparatus 200 is in a hand of the user based on motions of the apparatus 200. In one example, periodic motion of the apparatus 200 that includes various rotations, but does not include large translations of the apparatus 200 may indicate that the apparatus is being held by the user. In one example, periodic rotations, such as rotations every few seconds, may indicate that a user is holding the apparatus 200. In another example, large translations of the apparatus may include translations that are less than the size of the apparatus. Therefore, in certain embodiments, the activity module 120 may determine that the apparatus is being held by a user based on motion that includes periodic rotations and does not include large translations of the apparatus.

In another example, the motion sensor 202 may detect regular translations of the apparatus 200. For example, the apparatus may be in a pocket of a user while the user is walking. This may result in the motion sensor 202 detecting translations occurring at a regular interval. The regular interval may be similar to the interval associated with each step of the user.

In another example, the motion sensor 202 may detect small motions, such as translations that are less than 1 inch. In another example, the motion sensor 202 detect small rotations, such as rotations of the apparatus that are less than 20 degrees. In one example, the motion sensor 202 may sense translations that are larger than 1 inch and the activity module 120 may determine that a user is using the apparatus 200. In another example, the motion sensor 202 may sense rotations that are larger than 20 degrees and the activity module 120 may determine that a user is using the apparatus 200.

In another embodiment, activity module 120 may store a threshold value. The motion sensor 202 may sense motions that exceed the threshold value and the activity module 120 may indicate user activity at the apparatus 200 based on the sensed values exceeding the threshold values. In another example, although the motion sensor 202 may sense motion of the apparatus 200, the sensed motion may be less than a threshold motion. In this example, the activity module 120 may determine that the apparatus 200 is not being used. In response to the activity module 120 determining that the apparatus 200 is not being used, the display module 140 may clear the display 104.

In one example, a user may hold the apparatus while traveling in a car, bus, truck, or the like. In this example, the motion sensor 202 may sense motion of the apparatus 200 based on motions associated with riding in a car. The motion sensor 202 may determine a difference between motions associated with riding in a vehicle, and motions associated with a user using the apparatus 200. Motions associated with riding in a car may include small but persistent motions. For example, motions that include a detected translation of less than 0.5 inches and the detected translations occur persistently, such as several times each second may indicate that the apparatus 100 is being transported in a vehicle. Therefore, in this example, the activity module 120 may not determine that the apparatus 100 is being used by a user.

In another embodiment, the activity module 120 may reset a timer 210 for the apparatus 200 in response to detecting motion of the apparatus 200. The display module 140 may prevent clearing of the display in response to the timer 210 not having expired.

In another embodiment, the display 104 may include a touch screen. The touch sensor 204 may sense touches at the touch screen and the activity module 120 may determine that a user is using the apparatus 200 based on the non-tactile sensor 160 and the sensed touches. The touches may include single touches, multiple touches, gesture input, or other, or the like. The activity module 120 may determine use of the apparatus 200 based on the non-tactile sensor 160 and the sensed touches and the display module 140 may prevent clearing of the display 104 in response to the activity module 120 detecting user activity at the apparatus 200.

In another embodiment, the activity module 120 may reset a timer 210 for the apparatus 200 in response to input from the non-tactile sensor 160 and the touch sensor 204 detecting touches at a display 104 of the apparatus 200. The display module 140 may prevent clearing of the display 104 in response to the timer 210 not having expired.

In another embodiment, the non-tactile sensor 160 may include a data sensor 206. The data sensor 206 may sense data transmission at the apparatus 200 and the activity module 120 may determine use of the apparatus based on the sensed data transmissions. In one example, a browser executing on the apparatus 200 may request to load a web page. The data sensor 206 may sense data transmissions at the apparatus based on the web page loading. Although, in certain examples, the web page may take considerable time to load, the display module 140 may prevent clearing of the display 104 while the web page is loading. Therefore, although a user may not be moving the apparatus, or touching a touch screen of the apparatus, the display module 140 may prevent clearing of the apparatus while waiting for a web page to load.

In another example, a user may interact with an application executing on the apparatus 200. The application may receive a command from the user and the application may process the command. In one embodiment, the data sensor 206 may sense the application processing the command and the activity module 120 may determine user activity of the apparatus 200 based on the data sensor 206 sensing an application processing data. In another example, the data sensor 206 may determine that the user may be waiting for the application to respond. The activity module 120 may detect use of the apparatus 200 based on the application not having responded to a user command. The display module 140 may prevent clearing of the display 104 in response to a user interacting with an application executing on the apparatus 200. The interaction based on receiving user commands at the apparatus 200. In another embodiment, the application may periodically indicate to the apparatus 200 that the application is currently responding to a user and the activity module 120 may determine user activity based on the indication from the application.

In another embodiment, the activity module 120 may reset a timer 210 for the apparatus 200 in response to the data sensor 206 detecting data transmission at the apparatus 200. The display module 140 may prevent clearing of the display 104 in response to the sensed data transmissions.

In one embodiment, the user module 220 may include the facial recognition sensor 254. The facial recognition sensor 254 may recognize a user of the apparatus 200 and the activity module 120 may determine the use based on the facial recognition sensor 254 recognizing the user. The facial recognition sensor 254 may include any sensing device that is capable of recognizing a face of a user as one skilled in the art may appreciate. An application executing on the apparatus may learn a face of a user based on a training session. This may allow the facial recognition sensor 254 to learn the user. The facial recognition sensor 254 may include a camera, or other, to recognize the face of the user as one skilled in the art may appreciate. In response the facial recognition sensor 254 recognizing the face of the user, the activity module 120 may determine user activity at the apparatus 200. Therefore, in certain embodiments, the display module 140 may prevent clearing of the display 104 in response to the facial recognition sensor 254 recognizing the user, or recognizing a face of the user.

In another embodiment, the activity module 120 may reset a timer 210 for the apparatus 200 in response to the facial recognition sensor 254 recognizing a user at the apparatus 200. The display module 140 may prevent clearing of the display 104 in response to the facial recognition sensor 254 recognizing the user. Therefore, in certain examples, the display module 140 may prevent clearing the display 104 based on a user's face in view of the facial recognition sensor 254. For example, a user may hold the apparatus 200 in front of his/her face and the facial recognition sensor 254 may determine that the apparatus 200 is being used by the user based on the facial recognition sensor 254 recognizing the face of the user. This may also be the case if the motion sensor 202 senses no motion, or the data sensor 206 senses no data transmissions at the apparatus 200.

In another example, a user may turn his/her face away from the apparatus 200 and the facial recognition sensor 254 may no longer recognize the face of the user. Therefore, in certain examples, the activity module 120 may determine that the apparatus 200 is not being used based on a user not looking at the apparatus 200.

In another embodiment, the activity module 120 may reset a timer 210 for the apparatus 200 in response to the facial recognition sensor 254 detecting the face of the user. The display module 140 may prevent clearing of the display 104 in response to recognizing the user.

In another embodiment, the user module 220 may include an eye tracking sensor 252 that may track eyes of a user. The eye tracking sensor 252 may determine if a user's eyes are directed at the apparatus 200. The activity module 120 may determine that a user is using the apparatus 200 based on the user's eyes being directed at the apparatus 200, or at the display 104. The activity module 120 may determine that a user is not using the apparatus 200 in response to the eye tracking sensor 252 determining that a user's eyes are directed away from the apparatus 200, or away from the display 104. Therefore, in certain embodiments, the activity module 120 may determine use of the apparatus based on movement of the user's eyes.

In another embodiment, the activity module 120 may reset a timer 210 for the apparatus 200 in response to the eye tracking sensor 252 detecting motion of the user's eyes. The display module 140 may prevent clearing of the display 104 in response to the detected motion.

In another embodiment, the activity module 120 may reset a timer 210 for the apparatus 200 in response to any combination of the previously described sensors sensing respective conditions. The display module 140 may prevent clearing of the display 104 in response to any of the sensed conditions. In other examples, a value for the timer 210 may be adjusted by a user, received by a user, configured by a user, or the like. Therefore, in certain examples, a user may set the timer value in order to make the display 104 clear earlier or later, based on the value.

Figure 3:
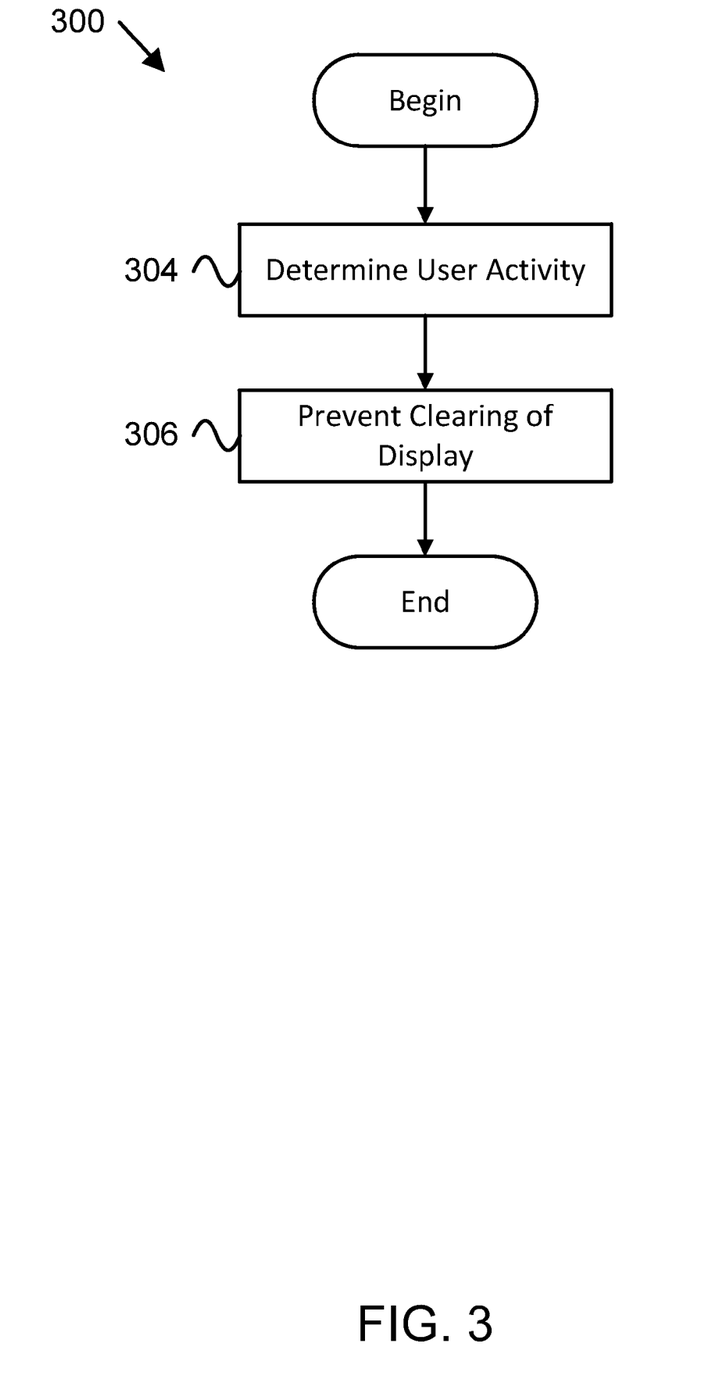
FIG. 3 is a schematic flow chart diagram illustrating one embodiment of a method for preventing clearing of a display.

FIG. 3 is a schematic flow chart diagram illustrating one embodiment of a method 300 for preventing clearing of a display. In one embodiment, the method may begin and the activity module 120 may determine 304 use of the apparatus 100 based on input from a non-tactile sensor 160. The display module 140 may prevent 306 clearing of the display in response to the use and the method 300 may end. In other embodiments, the method 300 may include receiving input from a tactile sensor as previously described.

Figure 4:
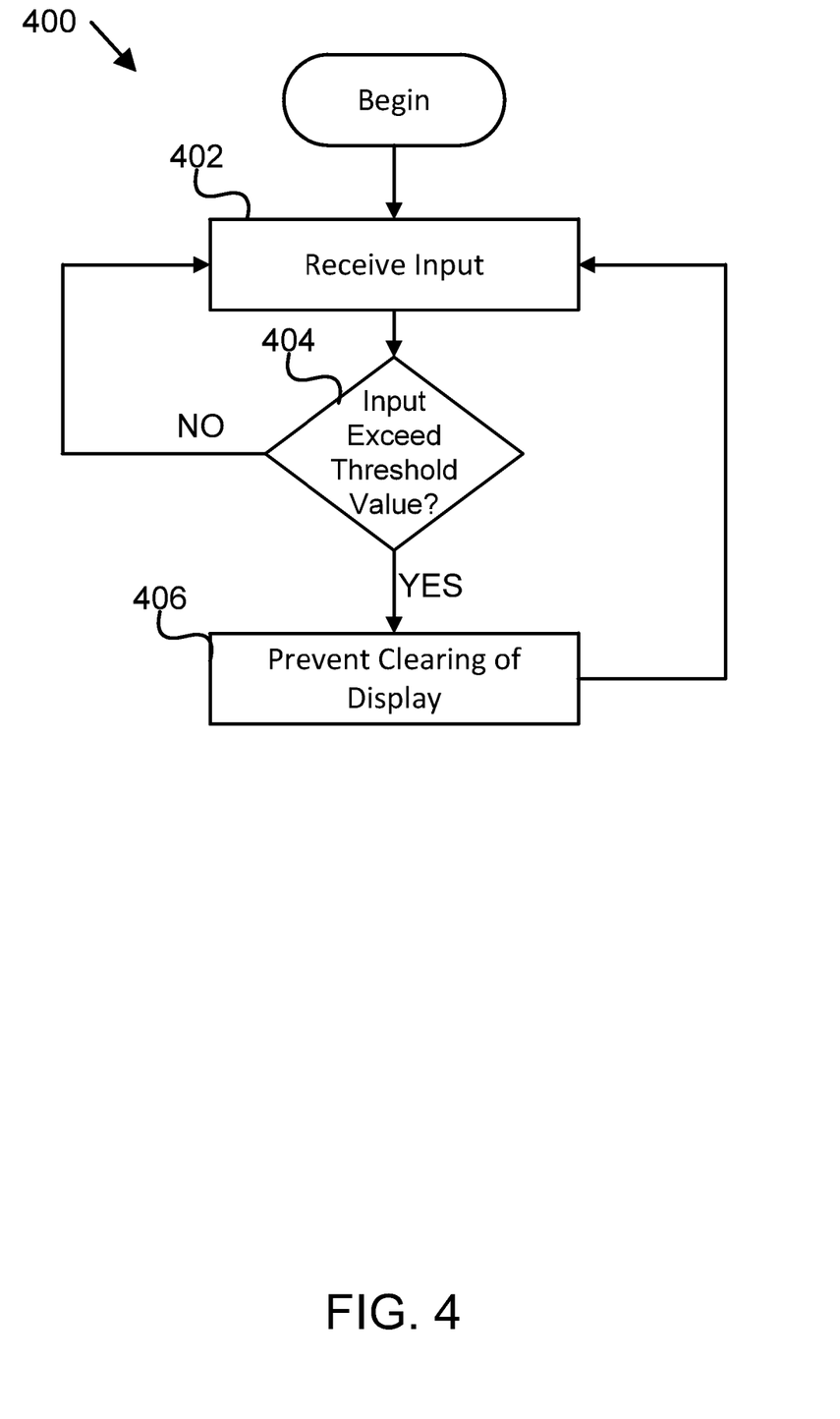
FIG. 4 is a schematic flow chart diagram illustrating one embodiment of a method for preventing clearing of a display.

FIG. 4 is a schematic flow chart diagram illustrating one embodiment of a method 400 for preventing clearing of a display. In one embodiment, the method 400 may begin and the activity module 120 may receive 402 input from a non-tactile sensor 160. The activity module 120 may determine 404 if the received input exceeds a threshold value. If the received value does not exceed the threshold value, the method may continue at block 402 where the activity module 120 may receive additional sensor input. If the received value does exceed the threshold value, the display module 140 may prevent clearing of the display 104 and the method may continue at block 402 where the activity module 120 may receive additional sensor input. In other embodiments, the method 400 may include receiving input from a tactile sensor as previously described.

Figure 5:
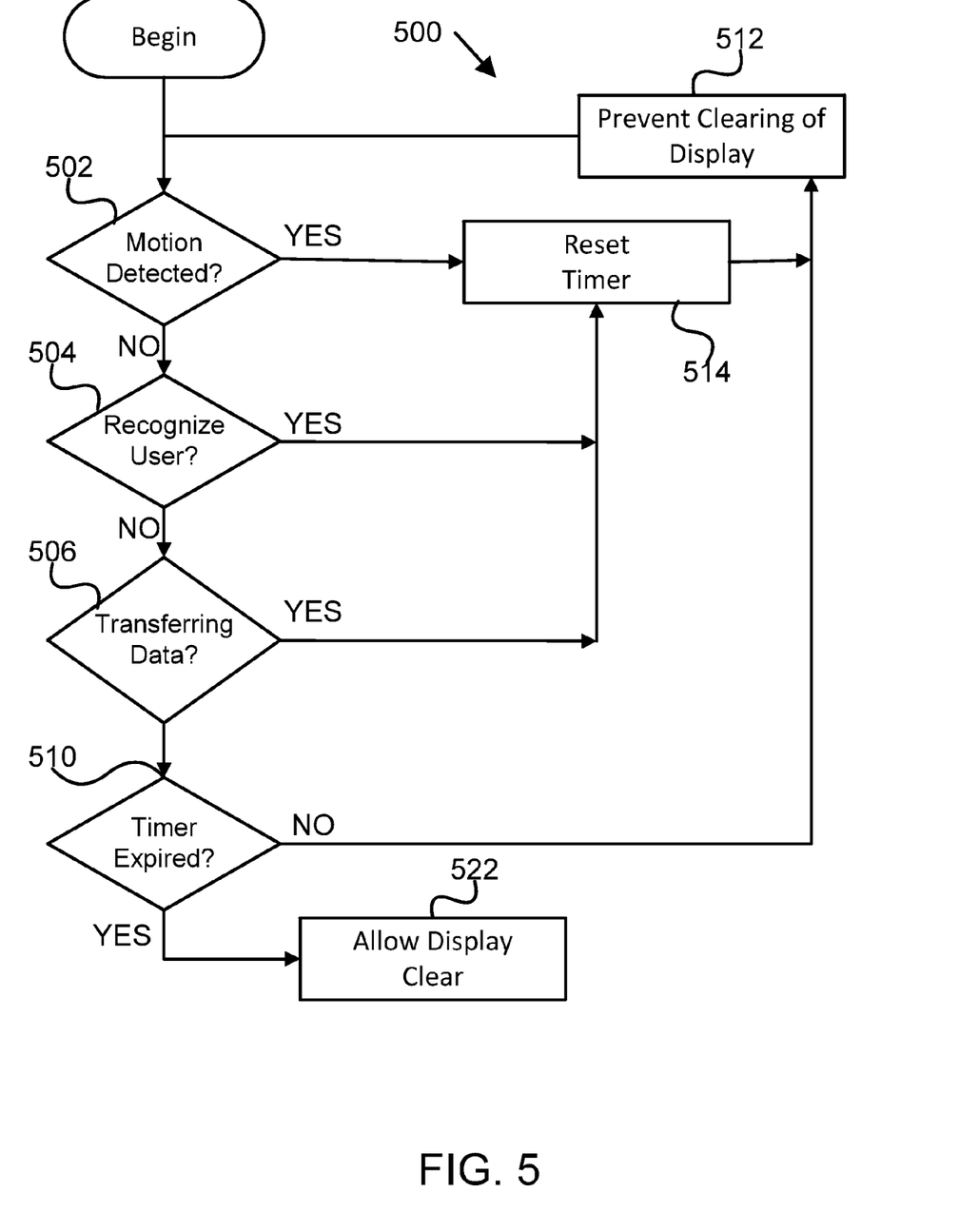
FIG. 5 is a schematic flow chart diagram illustrating one embodiment of a method for preventing clearing of a display.

FIG. 5 is a schematic flow chart diagram illustrating one embodiment of a method 500 for preventing clearing of a display. In one embodiment, the method 500 may begin and the motion sensor 202 may determine 502 if motion is detected. If the motion sensor 202 determines 502 that motion is detected the activity module 120 may reset 514 the timer 210 and the display module 140 may prevent 512 clearing of the display 104. If the motion sensor 202 determines 502 that there is no motion, the facial recognition sensor 254 may determine 504 if a user is recognized at the apparatus 100. If the facial recognition sensor 254 determines 504 that the user is recognized, the activity module 120 may reset 514 the timer 210 and the display module 140 may prevent 512 clearing of the display 104. If the facial recognition sensor 254 determines 504 that the user is not recognized, the data sensor 206 may determine if data is being transferred at the apparatus 100. If the data sensor 206 determines 506 that data is being transferred at the apparatus 100, the activity module 120 may reset 514 the timer 210 and the display module 140 may prevent 512 clearing of the display 104. If the data sensor 206 determines 506 that data is not being transferred at the apparatus 100, the timer 210 may determine 510 if time has expired. If the timer 210 determines 510 that time has not expired, the activity module 120 may prevent 512 clearing of the display 104. If the timer 210 determines 510 that time has expired, the display module 140 may allow 522 the display 104 to be cleared.

Therefore, in one embodiment, a sensor includes a data transmission sensor that senses data transmissions at the apparatus 100 and preventing clearing of the display 104 may be in response to data being transferred at the apparatus 100. In another embodiment, the sensor may include a facial recognition sensor 254 that recognizes a user of the apparatus 100 and activity module 120 may determine the user activity based on recognizing the user at the apparatus 100. In another embodiment, the method may include monitoring a timer 210 and preventing clearing of the display may be based on time remaining on the timer 210. In a further embodiment, the method 500 may include comparing a received input to a threshold value and the activity module 120 may determine user activity based on the received input exceeding the threshold value.

Figure 6:
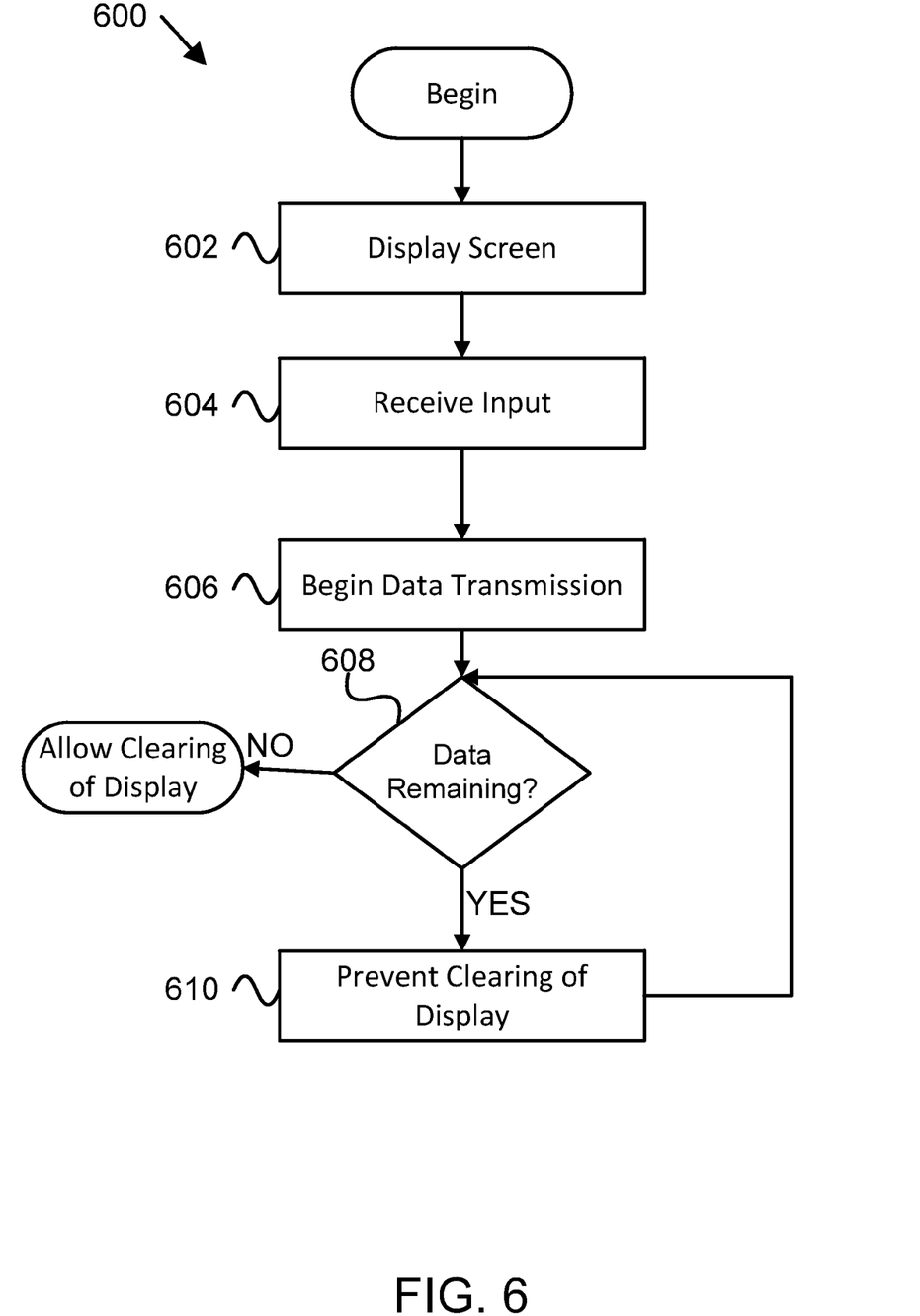
FIG. 6 is a schematic flow chart diagram illustrating one embodiment of a method for preventing clearing of a display.

FIG. 6 is a schematic flow chart diagram illustrating one embodiment of a method 600 for preventing clearing of a display. In one embodiment, the method 600 may begin and the display module 140 may display 602 at a screen. The activity module 120 may receive 604 input from one or more sensors as described herein. An application may begin 606 transmitting data. If data is remaining 608 to be transferred, the display module 140 may prevent clearing of the display 104 and return to block 608 to determine if data is remaining to be transferred. If data is no longer remaining to be transferred, the display module 140 may not prevent clearing of the display 104.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a display operatively coupled to the processor;
   a non-tactile sensor;
   a timer that measures a threshold amount of time;
   a memory that stores code executable by the processor to:
   determine, based on input from the non-tactile sensor, whether a first type of user activity at the apparatus exceeds a threshold amount of activity;
   simulate a second type of user activity at the apparatus in response to the first type of user activity exceeding the threshold amount of activity, the second type of user activity being different than the first type of user activity; and
   clear the display in response to the second type of user activity not being detected within the threshold amount of time, wherein the simulated second type of user activity resets the timer and prevents clearing of the display.

2. The apparatus of claim 1, wherein the non-tactile sensor comprises a motion sensor selected from the group consisting of an accelerometer and a camera, wherein the processor determines the first type of user activity based on motion of the apparatus exceeding a threshold motion.

3. The apparatus of claim 1, further comprising a touch sensor, wherein the processor determines the first type of user activity based input from the non-tactile sensor and the touch sensor.

4. The apparatus of claim 1, wherein the non-tactile sensor comprises a data sensor that senses data transmissions at the apparatus, wherein the processor determines the first type of user activity based on data transmissions at the apparatus.

5. The apparatus of claim 1, where the non-tactile sensor comprises a user module that recognizes a user of the apparatus, wherein the processor determines the first type of user activity based on recognizing the user.

6. The apparatus of claim 5, wherein the user module comprises a sensor for tracking eyes of the user, wherein the processor determines the first type of user activity based on movement of a user's eyes.

7. The apparatus of claim 5, wherein the user module comprises a sensor for facial recognition, wherein the processor determines the first type of user activity based on recognizing a face of the user.

8. A method comprising:
   receiving input from a non-tactile sensor;
   determining, based on input from the non-tactile sensor, whether a first type of user activity at an apparatus exceeds a threshold amount of activity;
   simulating a second type of user activity in response the first type of user activity exceeding the threshold amount of activity, the second type of user activity being different than the first type of user activity;
   preventing a display from clearing in response to detecting the second type of user activity within a threshold amount of time; and
   allowing clearing of the display in response to not detecting the second type of user activity within a threshold amount of time, wherein the simulated second type of user activity prevents clearing of the display.

9. The method of claim 8, wherein the non-tactile sensor senses data transmission at the apparatus, the method preventing the display from clearing in response to more than a threshold amount of data being transferred at the apparatus.

10. The method of claim 8, wherein the determining whether the first type of user activity based on the input from the sensor comprises determining the first type of user activity based on recognizing the user at the apparatus.

11. The method of claim 8, further comprising tracking eyes for the user, wherein the determining whether the first type of user activity exceeds a threshold amount of activity is further based on movement of the user's eyes.

12. A system comprising:
    a processor;
    a touch screen display operatively coupled to the processor;
    a non-tactile sensor that senses user activity at the system;
    an activity module that determines, based on the sensed user activity and input from the touch screen display, whether use of the system exceeding a threshold amount of activity; and
    a display module that simulates touch at the touch screen display responsive to the use of the system exceeding a threshold amount of activity and responsive to no user touching the touch screen display,
    wherein the display module prevents clearing of the display for a predetermined amount of time in response to input from the touch screen display, wherein the simulated touch also prevents clearing of the display for a predetermined amount of time.

13. The system of claim 12, wherein the non-tactile sensor comprises a data sensor that senses data transmissions at the system, the activity module determines use of the system based on the sensed data transmissions.

14. The system of claim 12, where the non-tactile sensor comprises a user module that recognizes a user of the apparatus, the activity module determines the use of the system based on recognizing the user.

15. The system of claim 14, wherein the user module comprises a sensor for tracking eyes of the user, the activity module determines the use of the system based on movement of a user's eyes.

16. The system of claim 14, wherein the user module comprises a sensor for facial recognition, the activity module determines the use of the system based on recognizing a face of the user.

17. The apparatus of claim 3, wherein simulating the second type of user activity comprises the processor simulating a touch at the touch sensor to prevent clearing of the display.

18. The apparatus of claim 1, wherein the processor further prevents clearing of the display in response to the timer not being expired and allows clearing of the display in response to expiration of the timer.

19. The method of claim 8, further comprising:
    monitoring a timer;
    preventing clearing of the display in response to the timer not being expired;
    allowing clearing of the display in response to expiration of the timer; and
    resetting the timer in response to detecting the second type of user activity, wherein the simulated second type of user activity also resets the timer.

20. The system of claim 12, further comprising a timer, wherein the display module further prevents clearing of the display in response to the timer not being expired and allows clearing of the display in response to expiration of the timer, wherein the activity module resets the timer in response to the second type of user activity, wherein the simulated second type of user activity also resets the timer.

* * * * *